United States Patent
Yamashita

[11] Patent Number: 5,898,914
[45] Date of Patent: Apr. 27, 1999

[54] METHOD OF GENERATING A RINGING SIGNAL IN A SATELLITE COMMUNICATIONS SYSTEM

[75] Inventor: Hiroshi Yamashita, Tokyo, Japan

[73] Assignee: NEC Corporation, Japan

[21] Appl. No.: 08/724,373

[22] Filed: Oct. 1, 1996

Related U.S. Application Data

[63] Continuation of application No. 08/177,554, Jan. 5, 1994, abandoned.

[30]    Foreign Application Priority Data

Jan. 5, 1993 [JP] Japan .................................. 5-000329

[51] Int. Cl.$^6$ ......................................................... H04Q 7/00
[52] U.S. Cl. .......................... 455/403; 370/209; 370/216; 342/354; 379/201; 379/115
[58] Field of Search ........................... 379/58, 201, 115; 455/403, 12.1, 422, 63, 427; 370/209, 215; 342/354

[56]              References Cited

U.S. PATENT DOCUMENTS

| 4,273,962 | 6/1981  | Wolfe            | 455/12.1 |
|-----------|---------|------------------|----------|
| 5,029,202 | 7/1991  | Doernbach et al. | 379/201  |
| 5,268,694 | 12/1993 | Jan et al.       | 342/354  |
| 5,299,188 | 3/1994  | Hotta et al.     | 370/31   |
| 5,309,474 | 5/1994  | Gilhousen et al. | 375/205  |

FOREIGN PATENT DOCUMENTS 03-162143  7/1991  Japan ........................................ 379/58

OTHER PUBLICATIONS

America Online, "Satellite Basd Cellular Telephone System", Jan. 1995.

*Primary Examiner*—William Cumming
*Attorney, Agent, or Firm*—Ostrolenk, Faber, Gerb & Soffen, LLP

[57]              ABSTRACT

A ringing signal is generated at one of a plurality of terminal stations in a SCPC-DAMA (single channel per carrier demand assigned multiple access) satellite communications system. The satellite communications system further includes a central station. Firstly, the central station determines a pair of speech channels in response to a call request from a calling terminal station via a control channel. Further, the central terminal determines a ringing signal pattern number by using a country code which has been sent via the control channel together with said call request. Following this, the central station applies the data indicting the pair of available speech channels to both of the calling terminal station and a called terminal station by way of another control channel. The called terminal station determines a ringing signal pattern using said ringing signal pattern number applied from the central terminal. The called terminal station generates a ringing signal which is used for alerting a destination subscriber terminal which is operatively coupled to the called terminal station.

2 Claims, 5 Drawing Sheets

FIG. 3

| COUNTRY CODE | RINGING SIGNAL PATTER NO. |
|---|---|
| 1 | 0001 |
| 33 | 0010 |
| 44 | 0011 |
| 45 | 0100 |
| 46 | 0101 |
| 47 | 0110 |
| 49 | 0111 |
| . | . |
| . | . |

LOOK-UP TABLE IN MEMORY SECTION 50

FIG. 4

| RINGING SIGNAL PATTER NO. | PATTER DATA |
|---|---|
| 0001 | A |
| 0010 | B |
| 0011 | C |
| 0100 | D |
| 0101 | E |
| 0110 | F |
| 0111 | G |
| . | . |
| . | . |

LOOK-UP TABLE IN EACH OF MEMORY SECTIONS 52a AND 52b

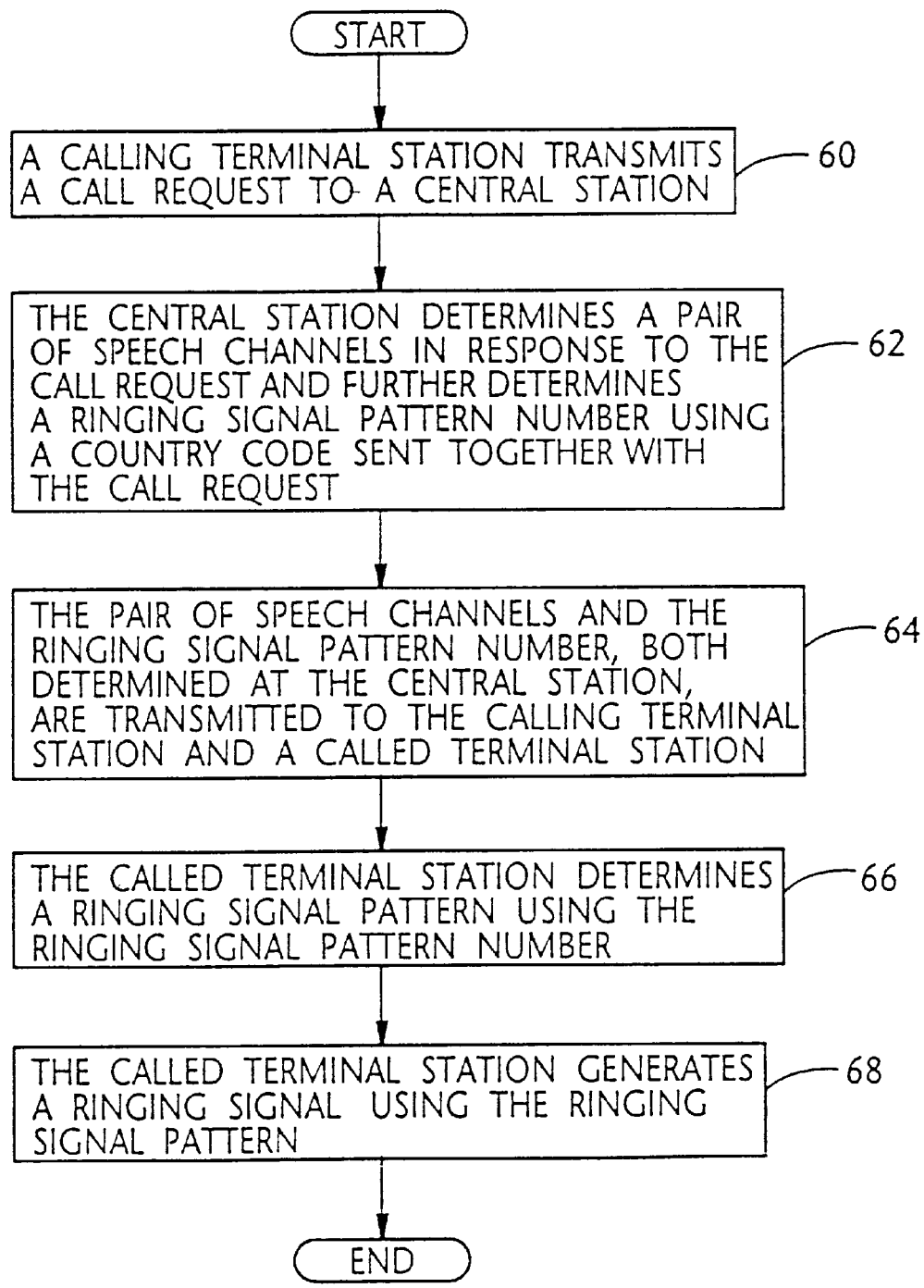

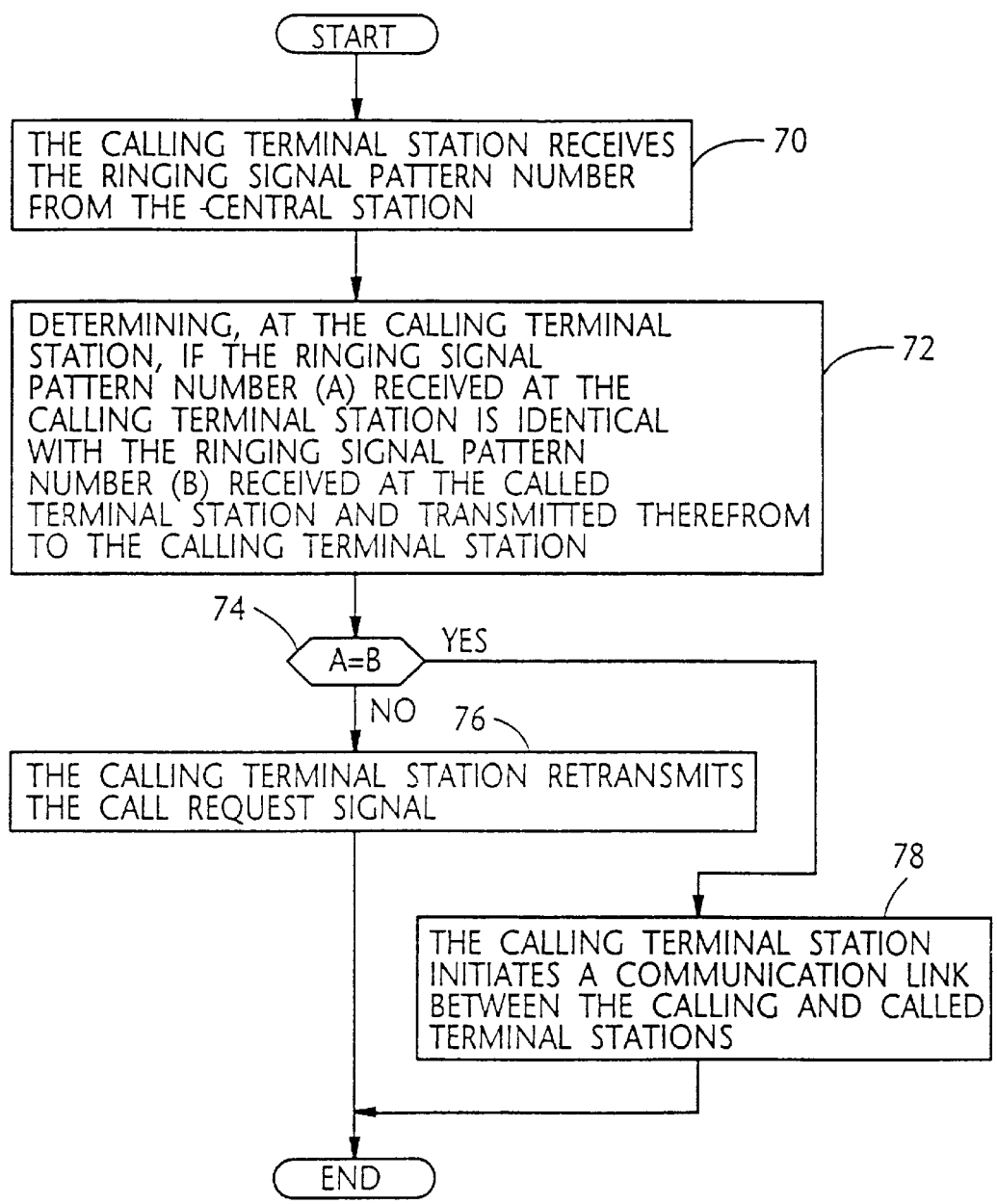

5,898,914

METHOD OF GENERATING A RINGING SIGNAL IN A SATELLITE COMMUNICATIONS SYSTEM

This is a Continuation of application Ser. No. 08/177,554, filed on Jan. 5, 1994, now abandoned.

BACKGROUND OF THE INVENTION

1. Field of the Invention

The present invention relates generally to improvements in a satellite communications system, and more specifically to a method of generating a ringing signal in a DAMA (demand assigned multiple access) satellite communications system. A communication in the system is established on a SCPC (single channel per single carrier) basis. The present invention is able to provide the system with flexibility in terms of a system design in that a ringing signal at a given terminal station is changed without difficulty.

2. Description of Prior Art

Before turning to the present invention it is deemed preferable to describe, with reference to FIG. 1, a known satellite communications system to which the present invention is applicable.

In FIG. 1, the arrangements which are not directly concerned with the present invention are omitted merely for the sake of simplifying the disclosure.

As shown, a DAMA satellite communications system 10, which establishes a communication on a SCPC basis, includes a satellite 12, a central station 14, and a plurality of terminal stations (only two stations 16a and 16b are shown in this particular case). It is assumed that the terminal stations 16a and 16b are respectively located in different countries.

The central station 14 is provided with a controller 18 and a memory section 20. The controller 18 is arranged to supervise or control overall operations of the system while the memory section 20 stores data indicative of vacant channels which are available in the system 10.

The terminal station 16a is provided with a connection controller 22a and a ringing signal generator 24a. Similarly, the terminal station 16b has a connection controller 22b and a ringing signal generator 24b. Further, a plurality of subscriber terminals (only one is denoted by 26a in the figure) are coupled to the terminal station 16a. Similarly, a plurality of subscriber terminals (only one is denoted by 26b in the figure) are coupled to the terminal station 16b.

It is assumed that the subscriber terminal 26a of the terminal station 16a requests a call to the subscriber terminal 26b of the other station 16b. That is, the terminal stations 16a and 16b are respectively a calling and called station in this case. In order to establish a communication link between the terminal stations 16a and 16b, the station 16a transmits a call request to the central station 14 via a control channel CC1.

The controller 18 of the central station 14, in response to the call request from the station 16a via the satellite 12, determines if a pair of vacant speech channels is available. This check is accomplished by the controller 18 which refers to the memory section 20 which stores vacant channel data therein. It is assumed that a pair of speech channels VC1 and VC2 is available. Thus, the central station 14 advises, via another control channel CC2, the calling and called stations 16a and 16b that the speech channels VC1 and VC2 are to be used for communication between the terminal stations 16a and 16b.

In response to the above-mentioned replay relayed from the central station 14 via the control channel CC2, the connection controllers 22a and 22b initiate to establish the communication link between the stations 16a and 16b. At this time, the connection controller 22b of the terminal station 16b energizes the ringing signal generator 24b. Thus, a subscriber at the terminal 26b is alerted by the ringing signal applied to the subscriber terminal 26b.

A ringing signal is an AC (alternating current) or DC (direct current) signal sent out from the terminal station to a subscriber terminal.

It is known in the art that a ringing voltage, the frequency thereof and the interval (viz., period) of the application of the ringing voltage to the subscriber terminal are different with different countries. Throughout the instant disclosure, the aforesaid electric characteristics of a ringing signal are referred to as a ringing signal pattern.

When the terminal stations 16a and 16b are initially installed, each of the ringing signal generators 24a and 24b is adapted such as to exhibit the ringing signal (viz., ringing signal pattern) which is required in the area or country in which the terminal station is located. Each of the ringing signal generators 24a and 24b is a circuit which is usually prepared using a plurality of discrete electric components in order to generate a required ringing signal.

Therefore, the above-mentioned prior art has encountered the drawback in that the ringing signal generator is fixedly adjusted to produce a predetermined ringing signal and thus is very difficult to be changed to generate a different signal if such a requirement occurs.

SUMMARY OF THE INVENTION

It is an object of the present invention to provide a method of generating a ringing signal in a DAMA satellite communications system which signal can easily be changed when required.

In brief, according to the present invention, a ringing signal is generated at one of a plurality of terminal stations in a SCPC-DAMA (single channel per carrier demand assigned multiple access) satellite communications system. The satellite communications system further includes a central station. Firstly, the central station determines a pair of speech channels in response to a call request from a calling terminal station via a control channel. Further, the central terminal determines a ringing signal pattern number by using a country code which has been sent via the control channel together with the call request. Following this, the central station transmits the data indicating the pair of available speech channels to both of the calling terminal station and a called terminal station by way of another control channel. The called terminal station determines a ringing signal pattern using the ringing signal pattern number transmitted from the central terminal. The called terminal station generates a ringing signal which is used for alerting a destination subscriber terminal which is operatively coupled to the called terminal station.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 3 shows a memory section for storing a look-up table for use in the system shown in FIG. 2;

FIG. 4 shows a memory section for storing another look-up table for use in the system shown in FIG. 2; and FIGS. 5 and 6 are flow charts which each show the steps which characterize the operation of the present invention.

DETAILED DESCRIPTION OF THE PREFERRED EMBODIMENTS

Figure 2:
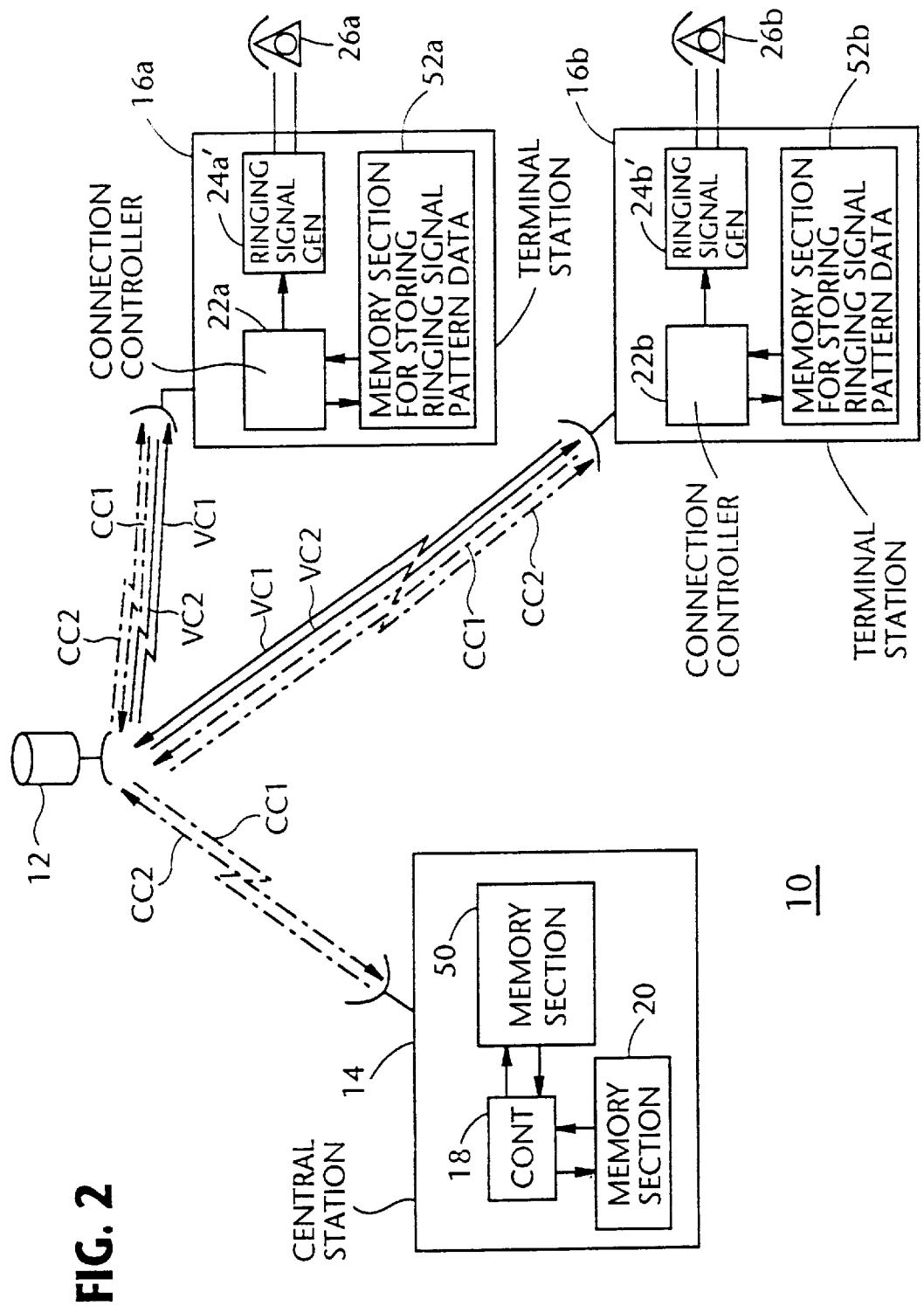
FIG. 2 is a diagram schematically showing a preferred embodiment of the present invention in block diagram form.

Reference is now made to FIGS. 2–6. FIG. 2 schematically illustrates an embodiment of the present invention in block diagram. On the other hand, each of FIGS. 3 and 4 shows a look-up table provided in the arrangement of FIG. 2.

Figure 1:
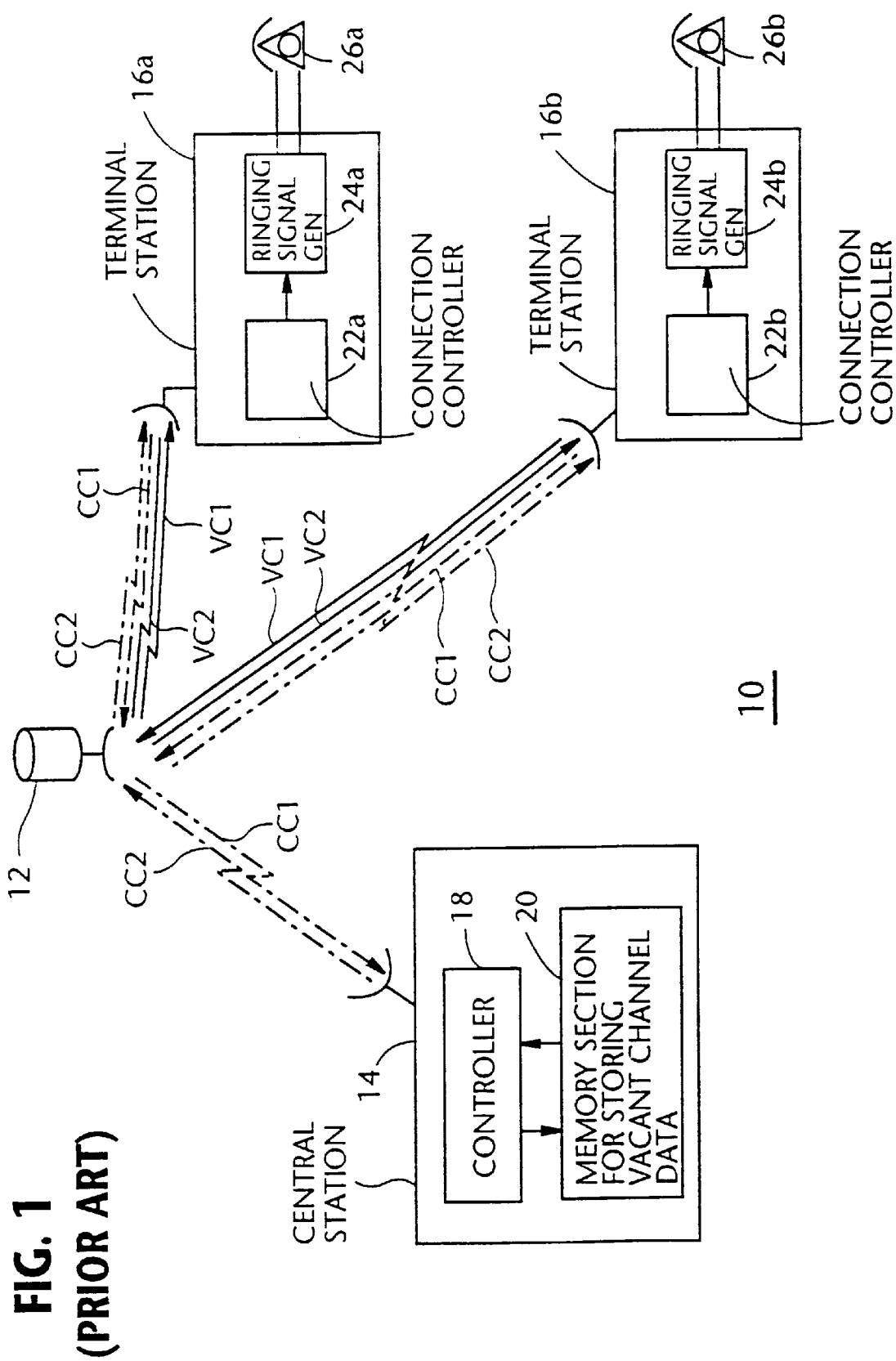
FIG. 1 is a diagram schematically illustrating a know satellite communications system in block diagram form, referred to in the opening paragraphs of the instant disclosure.

The arrangement of FIG. 2 differs primary from that of FIG. 1 in that the stations 14, 16a and 16b of the former arrangement further include memory sections 50, 52a and 52b, respectively. In more specific terms, the memory section 50 stores a look-up table which includes a plurality of country codes and the corresponding ringing signal pattern numbers (FIG. 3). On the other hand, each of the memory sections 52a and 52b stores a look-up table which includes the above-mentioned ringing signal pattern numbers and the corresponding ringing signal pattern data (FIG. 4).

In FIG. 3, the country codes depicted by numerals 1, 33, 44, . . . , etc. specify respectively the United States, France, the United Kingdom, . . . That is, the country codes shown in FIG. 3 are exactly the same as currently used in the international telephone network system. In this embodiment, the country codes are respectively assigned ringing signal pattern numbers "0001", "0010", "0011", . . . as denoted in the right column of FIG. 3.

In FIG. 4, the above-mentioned pattern numbers "0001", "0010", "0011", . . . , etc. indicate respectively ringing signal pattern data denoted by capital letters A, B, C, . . . . For the sake of a better understanding, a given ringing signal pattern data specifies a ringing voltage 70V at 17 Hz with a ringing tone which is one second ON and the three seconds OFF (merely by way of example).

As in the prior art, it is assumed that the subscriber terminal 26a of the terminal station 16a requests a call to the subscriber terminal 26b of the other station 16b. In order to establish a communication between the terminal stations 16a and 16b, the station 16a transmits a call request to the central station 14 via the control channel CC1.

It should be noted that the call request includes a country code in a telephone number which indicates the destination (viz., the subscriber terminal 26b of the station 16b).

The controller 18 of the central station 14, in response to the call request from the station 16a via the satellite 12, determines if a pair of vacant speech channels is available. This check is accomplished by the controller 18 by referring to the memory section 20 which stores vacant channel data therein. It is assumed that a pair of speech channels VC1 and VC2 is available.

Further, the controller 18 of the central station 14 determines that the ringing signal pattern number which is specified by the country code which is included in the destination telephone number transmitted from the terminal station 16a.

Subsequently, the central station 14 transmits, via the control channel CC2, a control signal to both the calling and called stations 16a and 16b. In this instance, the control signal indicates that: (a) the speech channels VC1 and VC2 are to be used for communication between the terminal stations 16a and 16b and (b) the ringing signal specified should be used for alerting the subscriber at the terminal 26b.

The connection controller 22a of the station 16a, in response to the above-mentioned control signal transmitted thereto from the central station 14 via the control channel CC2, if the ringing signal pattern number received thereat coincides with the pattern number received by the called station 16b. If the answer is negative, the terminal station 16a again send the above-mentioned call request to the central station. Contrarily, if the answer is affirmative, the station 16a transmits a control signal indicative of the coincidence between the two pattern numbers and initiates establishment of the communication link between the terminals 26a and 26b. At this time, the connection controller 22b of the called station 16b determines the ringing signal pattern specified by the pattern number applied from the central station 14 by a transmitter. Subsequently, the controller 22b energizes a ringing signal generator 24b' according to the ringing signal pattern whereby the subscriber at the terminal 26b is alerted.

A ringing signal generator 24a' of the station 16a operates in exactly the same manner as the counterpart 24b in the case where the station 16a becomes a called station. In FIGS. 5 and 6 are provided flow charts which show the steps of the operation of the present invention.

It will be understood that the above disclosure is representative of only one possible embodiment of the present invention and that the concept on which the invention is based is not specifically limited thereto.

What is claimed is:

1. A method of generating a ringing signal at one of a plurality of terminal stations in a SCPC-DAMA (single channel per carrier demand assigned multiple access) satellite communications system, said satellite communications system further including a central station, said method comprising the steps of:

(a) determining, at said central station, a pair of speech channels in response to a call request transmitted from a calling terminal station by a first control channel;

(b) determining, at said central station, a ringing signal pattern number by using a country code sent by said first control channel together with said call request;

(c) transmitting said pair of speech channels and said ringing signal pattern number to both said calling terminal station and a called terminal station by a second control channel;

(d) determining, at said called terminal station, a ringing signal pattern using said ringing signal pattern number transmitted from said central station; and (e) generating said ringing signal using the ringing signal pattern at said called terminal station, said ringing signal being transmitted to a destination subscriber terminal which is operatively coupled to said called terminal station;

wherein said calling terminal station determines if said ringing signal pattern number received at said calling terminal station is identical with the ringing signal pattern number received at said called terminal station and transmitted therefrom to said calling terminal station, and wherein if said calling terminal station detects that the ringing signal pattern numbers received at said calling and called terminal station are not identical with each other, said calling terminal station retransmits said call request to said central station.

2. A method of generating a ringing signal at one of a plurality of terminal stations in a SCPC-DAMA (single channel per carrier demand assigned multiple access) satellite communications system, said satellite communications system further including a central station, said method comprising the steps of:

(a) determining, at said central station, a pair of speech channels in response to a call request transmitted from a calling terminal station by a first control channel;

(b) determining, at said central station, a ringing signal pattern number by using a country code sent by said first control channel together with said call request;

(c) transmitting said pair of speech channels and said ringing signal pattern number to both said calling terminal station and a called terminal station by a second control channel;

(d) determining, at said called terminal station, a ringing signal pattern using said ringing signal pattern number transmitted from said central station; and (e) generating said ringing signal using the ringing signal pattern at said called terminal station, said ringing signal being transmitted to a destination subscriber terminal which is operatively coupled to said called terminal station;

wherein said calling terminal station determines if said ringing signal pattern number received at said calling terminal station is identical with the ringing signal pattern number received at said called terminal station and transmitted therefrom to said calling terminal station, and wherein if said calling terminal station detects that the ringing signal pattern numbers received at said calling and called terminal stations are identical with each other, said calling terminal station initiates a communication link between said calling and called terminal stations.

* * * * *